United States Patent [19]

Jasmagy, Jr.

[11] Patent Number: 4,844,400
[45] Date of Patent: Jul. 4, 1989

[54] DRINK CONTAINER HOLDER

[76] Inventor: Clarence W. Jasmagy, Jr., P.O. Box 256, Lakeside, Calif. 92040

[21] Appl. No.: 177,923

[22] Filed: Apr. 5, 1988

[51] Int. Cl.$^4$ ............................................. A47K 1/09
[52] U.S. Cl. .................................. 248/311.2; D7/70; 24/700; 248/214; 248/314
[58] Field of Search ............... 248/311.2, 214, 215, 248/314, 274; 224/42.45 R; D6/535; D7/70; 24/3 F, 703, 698, 700, 701

[56] References Cited

U.S. PATENT DOCUMENTS

| | | | |
|---|---|---|---|
| 804,545 | 11/1905 | Paine | 24/3 F |
| 3,698,675 | 10/1972 | Lerew et al. | 248/311.2 |
| 3,807,674 | 4/1974 | Justen | 248/311.2 |
| 3,814,367 | 6/1974 | Rasmussen | 248/311.2 |
| 4,333,264 | 6/1982 | Smet | 24/703 X |
| 4,606,523 | 8/1986 | Statz et al. | D7/70 X |
| 4,629,153 | 12/1986 | Marcum | 248/311.2 |
| 4,634,089 | 1/1987 | Wright et al. | 248/311.2 |
| 4,655,425 | 4/1987 | Wallace et al. | 248/311.2 |
| 4,678,154 | 7/1987 | McFarland | 248/311.2 |
| 4,697,780 | 10/1987 | Wenkman et al. | 248/558 |

Primary Examiner—Reinaldo P. Machado
Assistant Examiner—David L. Talbott
Attorney, Agent, or Firm—Frank D. Gilliam

[57] ABSTRACT

A method of manufacture and the resulting two piece drink container holder for removal attachment to an automobile vehicle within a window glass channel. The drink container holder comprises an open conical central body portion and a removable hanger portion which removably attaches to the central body portion. The central body portion of the conical housing includes a partially open bottom surface and an elongated vertical slot through which a drink container handle can protrude. The hanger portion passes through a second slot formed through a bracket attached to in the conical central body portion when removably attached thereto. The hanger portion includes an outer distal end portion for inserting within the window channel of an automobile. The hanger portion is constructed of a formable material which allows the hanger to be bent formed intermediate its end and will retain that bent form to conform to variations in distance between the window channel and the inner surface of the automobile adjacent the user of the container holder without becoming damaged at the bend line.

4 Claims, 1 Drawing Sheet

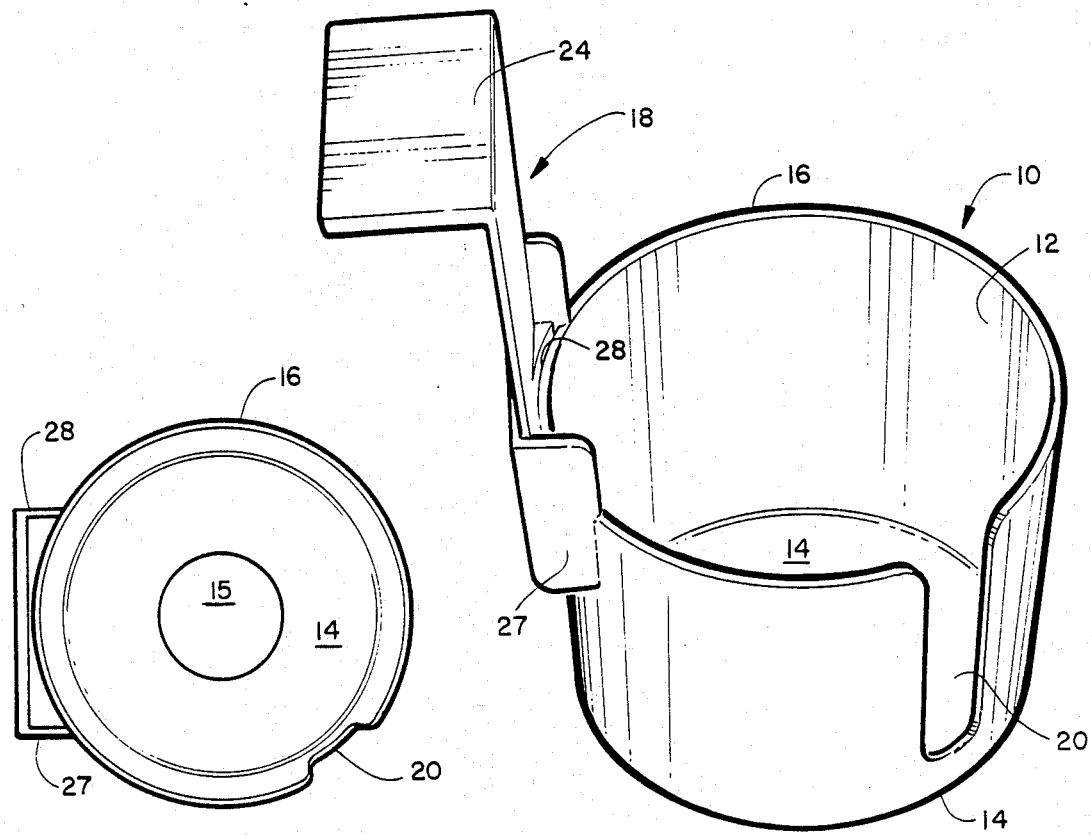
FIGURE 1
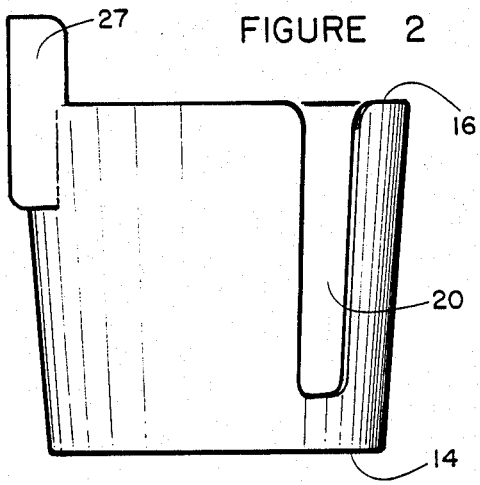
FIGURE 2
FIGURE 3
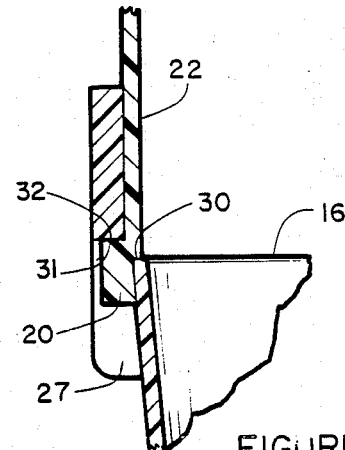
FIGURE 5
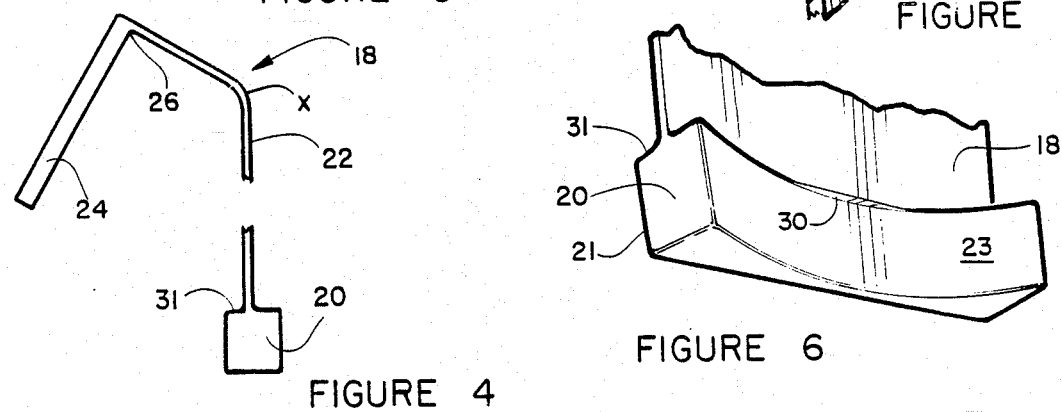
FIGURE 4
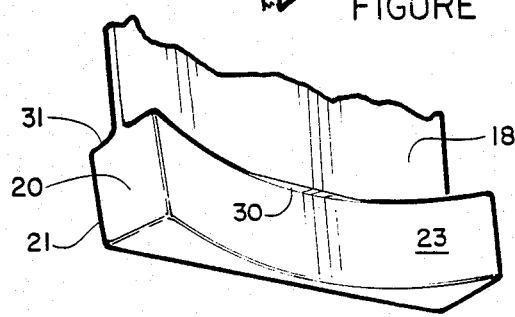
FIGURE 6

DRINK CONTAINER HOLDER

BACKGROUND OF THE INVENTION

The invention relates generally to holder devices for supporting drink containers for securement to the door of an automobile vehicle, and more particularly to devices of this type which can be readily installed within a window channel of automobiles with different span distances between the window channel and the vertical surface of the automobile adjacent to the user of the drink container.

Numerous arrangements for holding glass bottles, metal cans, cups, etc. and other containers have been proposed, and have met with varying degrees of success. Prior beverage container holders have incorporated cup-like plastic castings constituted of polyethylene or other relatively rigid plastic material, or metal, and were provided with supporting arms or brackets by which they could be cemented in place on, or otherwise connected to the door of a vehicle.

U.S. Pat. No. 3,698,675 issued to Wilford J. Lerew et al. teaches a holder which comprises a body portion including a concavity to receive a receptacle, an uprising hanger terminating with a hook portion for placement over an object to support the device.

U.S. Pat. No. 4,508,303 issued to Frank S. Beckerer, Jr., teaches a one-piece container holder constituted of resilient, molded plastic substance having a bottom surface adapted to encircle and support the container. There is provided on the side wall of the container holder a flat portion which is adapted to mount against a generally vertical wall of a vehicle where it can be fixedly attached.

A drink container holder which has a molded plastic holder portion with a base or shelf, open arms which embrace the container and a rubber-like pliable connector extension which removedly attaches to the holder portion and is adapted for insertion in the vehicle window channel is produced by Rubber Queen Pretty Products, Inc. of Caskacton, Ohio. This device has the disadvantage of allowing the holder portion to move relative to the vehicle wherein open containers tend to spill when the vehicle turns, breaks etc. Also the rubber-like connector strap requires sufficient thickness which makes the holder difficult to install and remove from the window channel of newer vehicles with little or no window channel ware and vehicles with little or no space between the window channel edges and the window.

SUMMARY OF THE INVENTION

The disadvantages and drawbacks of prior art container devices for automobiles are largely obviated by the present invention which provides a novel and improved container holder which is extermely simple in construction, inexpensive to manufacture, and both easy to use and reliable in operation.

An object of this invention is to provide a container holder of two piece construction.

Another object of this invention is to provide a container holder for an automobile which can be installed and removed with no special skill on the part of the user.

Still another object of this invention is to provide a container holder which can be removably attached to an automobile without the use of tools.

Yet another object of this invention is to provide a container holder for an automobile which can be attached to the vehicle without damaging the appearance of the vehicle by the attachment.

Yet another object of this invention is to provide a container holder with a substantially rigid hanger member which can be formed and reformed as required in different automobiles to conform to various different distances between the window channels and the vertical surface adjacent to the user of the container and yet be rigid enough to support a container with a liquid substance within in a safe non-spill manner.

Additional advantages and features of the present invention will become apparent from the following description of the preferred embodiment taken in conjunction with the accompanying drawings and the claims appended hereto.

BRIEF DESCRIPTION OF THE DRAWINGS

FIG. 1 is an elevated perspective showing of the container holder of the invention;

FIG. 2 is a top plan view of the container holder of the invention;

FIG. 3 is a side view of the container holder of the invention;

FIG. 4 is a side view of the hanging strap of the container holder of the invention;

FIG. 5 is a section view of the hanger and container holder engagement; and

FIG. 6 is a section of the container engaging end of the hanger.

DESCRIPTION OF THE PREFERRED EMBODIMENT

Referring now specifically to drawing FIGS. 1–3, FIG. 1 depicts a perspective showing of the container holder 10 of the invention, FIG. 2 shows a top plan view of the conical housing 12 and FIG. 3 shows a side view of the conical housing. The open conical housing 12 is constructed of rigid or semi-rigid springy material such as by way of example, and not by way of limitation, a high impact resin such as, any of the styrene, A.B.S., similar materials of the acrylic family or material with similar characteristics. The conical housing 12 has a flat bottom surface 14 located across the smallest dimensioned end opening of the conical housing. The bottom surface 14 has an opening 15 therethrough (see FIG. 2) and an upper rim 16. A hanger member 18 is removably attached and locked to the open conical housing 12. A vertical slot or opening 20 extends from the rim 16 to a location intermediate the rim and bottom surface 14. As shown the vertical slot is positioned away from the hanger member attachment to the open conical housing. The opening 14 provides a drain for any liquid present in the interior of the container holder and the vertical slot 20 provides an opening which a cup handle or the like can protrude therethrough while being supported by the container.

Referring now to the various Figures and particularly to FIGS. 4–6, FIG. 4 is a side view showing of the hanger 18 of the invention, FIG. 5 is a side view cutaway showing of the conical housing with the hanger 18 engaged and locked thereto and FIG. 6 is a cutaway showing of the conical housing attachment distal end of the hanger 18.

The hanger 18 has an enlarged housing engaging end 20 with a rectilinear configured outer surface 21 and a curvilinear configured inner surface 23. The inner surface substantially conforming to the outer surface of the housing adjacent thereto, a relatively thin extended body portion 22 and a right angle formed window glass channel insertable end 24. The insertable end 24 is substantially thicker in cross section than the extended body portion 22 which is originally formed straight. The FIG. 4 showing of the extended body portion being slightly bent from its originally formed position is shown for the purpose of explanation only. The hanger 18 is formed of a material having pliable characteristics that can be bent at any length between locations 26 and location X and will hold any bend angle desired at X until again reformed at a different location X or different angle thereat. The distance between locations 26 and X is determined by the distance between the window channel and the interior vertical surface of the vehicle (not shown) adjacent to the user of the container holder, i.e. the interior surface of the door or side of the interior adjacent to a seat. The bend angle at X is determined by the slant of the interior vertical surface relative to the surface between locations 26 and X. An example of a pliable material suitable for construction of the hanger is a fifty-fifty blend of a high density polyethylene such as ID LS514 and a co-polymer ethylene such as ID 17Cp20 both of which can be obtained from the Rexene company. It should be understood, however, that any pliable material that is formable and reformable and maintains a formed state without damage or creasing at a bend of 90 degrees of more at a different lcoation again and again can be used to successfully practice this invention.

As can be seen in the various Figures, a bracket 27 is formed along rim 16 of housing 12 and includes an opening 28 for receiving the hanger 18. For installation, the hanger end 24 is inserted through the opening by deforming the rim 16 slightly toward the vertical center of the conical housing during insertion. The hanger is pulled through the opening until the enlarged end 20 is trapped between lip 30 and the rim 16 and surface 31 and edge 32. To remove the hanger 18 from the housing 12, the upper surface of the housing adjacent to lip 30 is again depressed inward toward the vertical center of the conical housing freeing the lock attachment between 16 and 30 and the hanger is pulled back through opening 28 in the reverse to the direction of installation.

When the hanger and housing are connected together to form the container holder as shown in FIG. 1 and use is intended, the end 25 is inserted between the window channel and the window glass of an automobile vehicle and the elongated portion of the hanger is then bent formed at a location X which is the distance between the window channel end and the inner surface of the vehicle door or surface adjacent to the end surface of a seat at an angle which positions the hanger adjacent to the inner surface of the vehicle in a position for use. After the forming is completed, the container holder hangs downward and is supported by the hanger attachment and the vertical surface of the automobile adjacent to the hanger. Although the hanger material of construction allows for forming as aforementioned the hanger is substantially rigid to prevent the container holder from moving back and forth relative to the adjacent automobile supporting surface and thereby preventing any liquid or the like in the container held by the container holder of the invention from spilling therefrom.

Numerous modifications of the subject invention will undoubtedly occur to those with skill in the art; however, it should be understood that the spirit and scope of the invention is to be limited solely in light of the appended claims.

What is claimed is:

1. A two piece holder for supporting a beverage container or the like in an automobile having a window and a window channel with a first surface extending the distance between the window channel and a second surface within the vehicle extending from said first surface and angled downwardly therefrom within said automobile adjacent to the user of the holder comprising:

an open conical housing;

a bottom surface for said housing positioned to cover the smaller end dimension of said conical housing, said bottom surface including an opening therethrough;

a normally planar hanger constructed of a substantially rigid pliable type material removably locked to said open conical housing by locking means with a distal end configured for insertion of a portion thereof between said window and said window channel for securing said two piece holder in a use position, said hanger being transversely bendable intermediate its ends so as to extend across said first surface and angle downwardly from said first surface along and against said second surface, and said hanger member selectively bendable and rebendable to accommodate length first surfaces, said locking means for removably locking said hanger to said conical housing comprises a bracket attached to the upper edge of said open surface of said conical housing opposite to the said bottom surface, said bracket including a slot therethrough for receiving said distal end by temporally distorting said conical housing adjacent to said slot and manually pulling said hanger member through said slot until the other end of said hanger member opposite to said distal end engages the bottom surface of said bracket, a lip on the upper surface of the other end of said hanger member engages the outer surface of said end when said temporally distorting said conical housing is terminated allowing said conical housing to return to its normal conical configuration thereby locking the hanger member within said slot.

2. The invention as defined in claim 1 wherein said open conical housing is constructed of a rigid springy material having memory.

3. The invention as defined in claim 2 wherein said springy material is a high density plastic.

4. The invention as defined in claim 1 wherein said hanger member is constructed of an approximately 50% high density polyethylene and 50% copolymer ethylene.

* * * * *